Patented Sept. 12, 1944

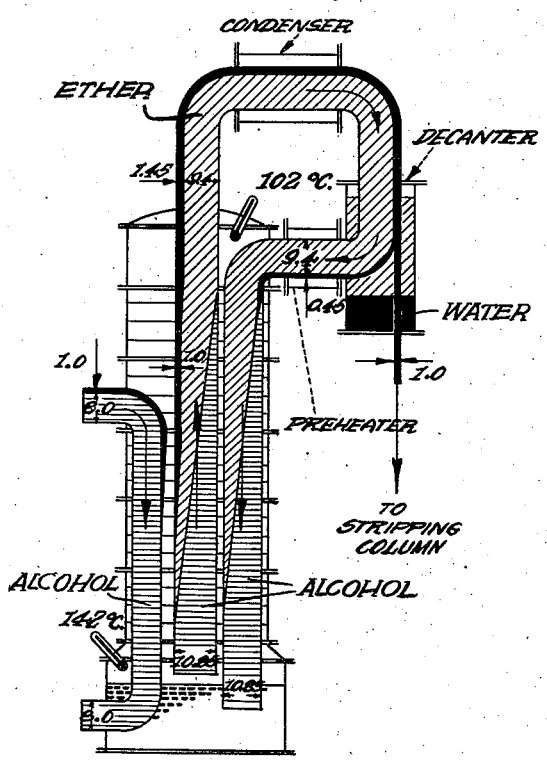
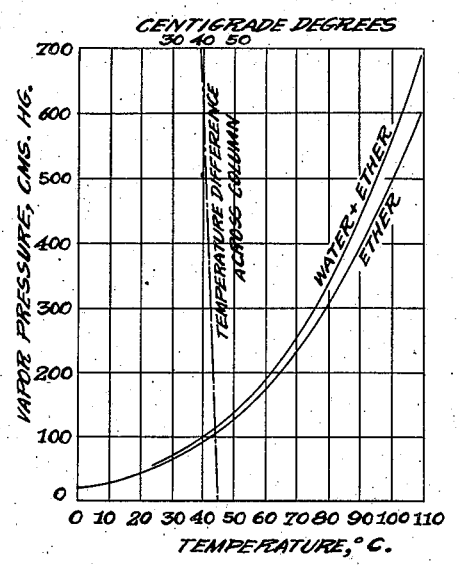
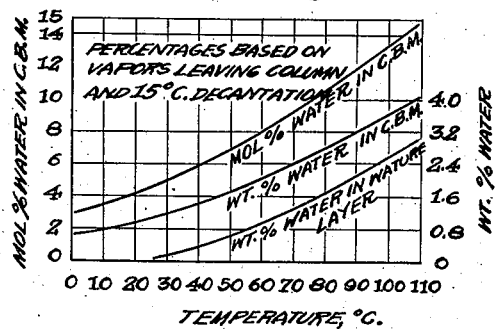

2,358,193

UNITED STATES PATENT OFFICE 2,358,193

METHOD OF OBTAINING ABSOLUTE ALCOHOL FROM AQUEOUS MIXTURES THEREOF

Theodore O. Wentworth, Cincinnati, Ohio

Application February 28, 1941, Serial No. 381,049

1 Claim. (Cl. 202—42)

This invention relates to a method for the production of absolute alcohol by means of which equipment generally in use may be greatly simplified and the heat cost substantially reduced.

The present method is based on the mutual physical relations of ether, water and alcohol; the method employing ethyl ether as the entraining agent in a single dehydrating unit.

The invention will be described with reference to the accompanying drawing, in which:

Figure 1 is a diagrammatic view indicating an azeotropic column, a condenser, preheater and decanter and showing the approximate molar and heat quantities flowing in such column in the dehydration of ethanol, employing ether as the entrainer, at 100 pounds gauge pressure. The widths of the bands represent the approximate number of moles of the respective vaporous and liquid constituents at each point in the system. Water is indicated by the solid black bands, alcohol by the bands of horizontal cross hatching, and ether by the bands of diagonal cross hatching.

Figure 2 is a graph showing the vapor pressure curves for water and ether and for the steam distillation of ether.

Figure 3 is a graph showing at various temperatures of distillation, the mol percent water in constant boiling mixture with ether; the corresponding weight percent water in constant boiling mixture with ether; and the weight percent water (based on the total quantity of distillate) which separates out in the water layer when decantation is effected at 15° C. In particular, this figure indicates the considerable improvement in the amount of water removed and discharged in the decanter when operating at higher temperatures of distillation; an increase from a practical zero amount of water and effectiveness at the temperature corresponding to the atmospheric boiling point to well over 3% of the total distillate at a boiling temperature of 110° C. at the corresponding pressure and a decantation temperature of 15° C.

I have found that by using a standard distilling column operated at from 30 to 150 pounds gauge pressure, supplied with a continuous feed of 90-95 percent alcohol, with heat supplied at the base (suitably by a steam coil) and with the column charged once and for all with a suitable amount of ethyl ether, I am able to obtain absolute alcohol free of ether at the base. The azeotropic mixture containing all of the water present in the feed (and substantially none of the alcohol) passes, still under the same pressure as that prevailing in the column, into a condenser and thence as condensate into a decanter. The ether and water separate into two layers and the ether layer is returned through a trapped pipe back to the top of the azeotropic column to serve as reflux. The water layer, saturated with dissolved ether, is passed to the top of a small stripper column, which may contain about twelve plates, and the dissolved ether removed in an azeotropic mixture with water which is passed to the main condenser.

A suitable standard pressure controlling mechanism may control the pressure and will be attached to the usual discharge or vent of the condenser, as is standard practice for regulating a pressure distillation.

The usual heat interchangers for feed heating by surface interchange with absolute alcohol produced, or by utilization of vaporous heat otherwise absorbed in the condenser, may be used.

The usual accessories, instruments, etc., associated with a distillation system of this type and familiar to those skilled in the art are, of course, added. Their use is outside the scope of my invention and is common practice.

The diagrammatic view, Figure 1, shows that the constant boiling mixture of alcohol and water, which prevails at atmospheric pressure and which may be calculated as containing approximately eight moles of alcohol to one mole of water and obtained as a usual distillation product, is fed to a mid-plate of the column. All of the water is removed in traversing the plates below the feed point, and the dehydrated alcohol descends to the base and is discharged.

The vapor from the reboiler consists entirely of anhydrous alcohol. At a plate near the base of the column, ether is encountered, which, by the condensation and revaporization continually taking place in a distilling column, is vaporized at the expense of a theoretically equal number of moles of alcohol vapor. At a somewhat higher point, although still below the feed plate, water is encountered and likewise is vaporized in conjunction with ether in the azeotropic mixture, since ether and water together have the lowest boiling point of any constituent.

Progressing upward to the feed plate all of the water which entered in the feed is found to be in a vaporous condition. This accounts for a still further reduction in the amount of alcohol in the vapor, since the same number of moles of alcohol condense to vaporize any given number of moles of water in the feed.

At a still higher point in the column, the returned water which is dissolved in the ether from the decanter is met and removed in the same fashion. At the top plate of the column a vapor mixture results which is substantially free of alcohol and which contains water and ether in the azeotropic ratio prevailing at the pressure of operation; that of the diagram being specified as 100 pounds per square inch gauge pressure. This vapor mixture is condensed and decanted at a suitably low temperature, and at either the same high pressure as that of the column or at atmospheric pressure, whichever is preferable.

The water layer leaves the decanter saturated with ether but containing such a small amount that it is not indicated in the diagrammatic view, Figure 1. The water dissolved in the ether layer, however, is appreciable; and this, with the ether, is carried back through the pre-heater to the top of the column where it enters as reflux. In the ordinary case, a pump will be employed to return the liquid to the pressure of the column if the decantation is not done under the high pressure of the column, as well as to overcome the pressure-drop through the preheater.

The loss by vaporization of the dissolved water in the descending stream of reflux, with consequent condensation of alcohol vapors, is illustrated in the diagrammatic view, Figure 1, adjacent the top plate. As the ether reflux descends, it meets the rising alcohol vapors and more and more ether is vaporized with resulting condensation of an equivalent number of moles of alcohol, until at a plate near the base of the column no ether is present and pure alcohol descends into the pot.

The dehydrating unit will have a temperature at the top corresponding to the temperature of the water-plus-ether curve in Figure 2 at the operating pressure employed. With pure alcohol in the stillpot, and neglecting the pressure drop across the column, the temperature in the pot will correspond to the boiling temperature of absolute alcohol at the vapor pressure equivalent to the operating pressure. Thus, if the vapor pressure curve of alcohol was plotted on a graph similar to Figure 2, the horizontal distance along the abscissa at any given pressure between the corresponding temperature of water-plus-ether and the temperature of alcohol at the same vapor pressure, would give the number of degrees of temperature difference between the top and the bottom of the column. In Figure 2 this relation of the temperature difference across the column is plotted against the corresponding vapor pressures, using the temperature scale at the top. There is a slightly lower temperature difference across the column at higher than at lower pressures. This function may be used to indicate the relative ease of separating the pure alcohol at the bottom of the column from the azeotropic mixture of ether and water at the top, since, in general, the temperature difference across the column indicates the relative ease of separation of the components of the mixture.

It is therefore apparent, that, while the heat economy due to the higher percentage of water in the water layer improves with increasing pressure, the ease of separation decreases slightly; and the number of plates in the azeotropic column will have to be increased with increasing pressure, to compensate for decreased temperature difference between the boiling point of alcohol and the temperature of the steam distillation of water and ether.

Furthermore, it is obvious that for a given capacity of alcohol dehydrated, the column may be made smaller in cross section with each increase in operating pressure, not only because of the greater amount of water removed for a given amount of ether distilled, but also because the volume of the vapor is approximately inversely proportional to the absolute pressure; and the same weight of vapors may thus be handled in smaller equipment.

Besides requiring smaller equipment, my process employs the minimum number of pieces of equipment for any azeotropic distillation process—i. e., a main azeotropic column still; a second stripping still; a single condenser, and a decanter, together with the necessary pumps, connections, etc. well known in the art. No other azeotropic method proposed for dehydrating alcohol can operate with so few pieces of equipment because of the necessity of additional dephlegmators, condensers, decanters, washers, columns for separating the entrainer and alcohol from the water layer, or alcohol from the solvent layer, etc.

The alcohol produced by my method is for all practical purposes entirely free of ether—i. e., not more than a few parts per million. The product is rigorously anhydrous, since the water is entirely removed at a higher level in the column than the ether. This practically perfect separation is possible because of the very large temperature differences; (a) between the boiling point of the azeotropic mixture, ether-water, and that of alcohol, and (b) between the boiling point of the azeotropic mixture of ether-water, and that of water, as compared to the respective boiling point differences for the usual systems which employ benzene, trichlorethylene, etc.

Having described my invention, what I claim and desire to secure by Letters Patent, is as follows:

The method of obtaining absolute alcohol from aqueous mixtures thereof by a single azeotropic distillation, employing ethyl ether as the entraining agent and under a pressure between 30–150 lbs. per square inch forming with the water a binary azeotrope, the ethyl ether being in amount sufficient to secure substantial dehydration of the mixture by a single azeotropic distillation.

THEODORE O. WENTWORTH.